United States Patent [19]

Rademachers et al.

[11] Patent Number: 4,681,637
[45] Date of Patent: Jul. 21, 1987

[54] PROCESS FOR THE PRODUCTION OF YELLOW-BROWN ZINC FERRITE PIGMENTS

[75] Inventors: Jakob Rademachers; Karlheinz Turban; Gerhard Franz; Werner Fuhr; Bernd Holle, all of Krefeld, Fed. Rep. of Germany

[73] Assignee: Bayer Aktiengesellschaft, Leverkusen, Fed. Rep. of Germany

[21] Appl. No.: 711,902

[22] Filed: Mar. 14, 1985

[30] Foreign Application Priority Data

Mar. 16, 1984 [DE] Fed. Rep. of Germany ....... 3409722

[51] Int. Cl.$^4$ .............................................. C09C 1/62
[52] U.S. Cl. ................................... 106/304; 106/296; 106/309
[58] Field of Search ........................ 106/309, 304, 296

[56] References Cited

U.S. PATENT DOCUMENTS

| | | | |
|---|---|---|---|
| 2,904,395 | 9/1959 | Downs et al. | 106/304 |
| 3,382,174 | 5/1968 | Hund et al. | 106/304 |
| 3,576,656 | 4/1971 | Webb et al. | 106/296 |
| 3,832,455 | 8/1974 | Smith et al. | 106/304 |
| 4,222,790 | 9/1980 | Dickerson | 106/304 |
| 4,261,966 | 4/1981 | Portes et al. | 106/304 |
| 4,459,276 | 7/1984 | Nobuoka et al. | 106/304 |
| 4,491,619 | 1/1985 | Biermann et al. | 106/304 |

OTHER PUBLICATIONS

Chemical Abstracts 6001, vol. 95, 12/81, No. 24, p. 82.

Primary Examiner—Paul Lieberman
Assistant Examiner—Willie J. Thompson
Attorney, Agent, or Firm—Sprung Horn Kramer & Woods

[57] ABSTRACT

A process for the production of an anisometric yellow-brown zinc ferrite pigment comprising homogeneously mixing zinc oxide having a specific BET surface of more than 2 m$^2$/g with needle-shaped α-FeOOH obtained from an iron salt solution by mixing with alkali and subsequently oxidizing in a nucleation and pigment growth stage, the FeOOH having a specific BET surface of about 15 to 25 m$^2$/g, an average needle width of about 0.025 to 0.125 μm and an average needle length of about 0.2 to 0.6 μm, annealing the mixture at a temperature of about 700° to 1000° C., cooling and grinding.

10 Claims, No Drawings

PROCESS FOR THE PRODUCTION OF YELLOW-BROWN ZINC FERRITE PIGMENTS

This invention relates to the production of yellow-brown heat-resistant zinc ferrite-based colored pigments. The invention relates more particularly to the production of anisometric zinc ferrite pigments with excellent industrial coloring properties.

Zinc ferrite crystallizes in a spinel lattice and, depending on the stoichiometric composition, additives, particle size, crystal shape and surface properties, is used as starting material for soft magnets, or as an anti-corrosive corrosive or colored pigment. This invention relates to the production of non-ferrimagnetic colored pigments which are known in English as "tans" pigments. These pigments are distinguishable by high stability under heat and purity. Consequently they are used instead of mixtures of iron oxide yellow and iron oxide red where high dyeing temperatures are demanded, such as when dyeing plastic materials, calcareous sandstones, grains of sand, stoving lacquers, enamels and ceramic glazes.

The production of yellow-brown colored pigments is described in U.S. Pat. No. 3 832 455. According to this patent they are obtainable by precipitating and oxidizing the iron from iron(II) sulphate solutions in the presence of zinc oxide or zinc carbonate at a pH value of 5 to 6 with subsequent filtration, washing, drying, and annealing. This process suffers from the disadvantage that very precise temperatures of from 49° to 52° C. have to be maintained during precipitation. Lower temperatures produce undesirable iron oxide hydroxides and higher temperatures cause the formation of undesired magnetic oxides.

According to the process of U.S. Pat. No. 2 904 395 the zinc ferrite pigments are produced by simultaneous precipitation from the corresponding iron- and zinc-containing solutions with subsequent filtration, washing, drying and annealing and by annealing an intimate mixture of ready-produced iron oxide hydroxide and zinc-oxide obtained in aqueous suspension. Calcination is carried out at a temperature of from 750° to 1000° C. in from 10 to 30 minutes with subsequent slow cooling of the reaction product to from 400° to 500° C. over a period of 10 minutes. In this case an accelerated reaction is required for the complete formation of the zinc ferrite during annealing to obtain highly brilliant shades of color. On the other hand, the undesirable growth of crystals, sintering and a noteworthy deficient quantity of bound oxygen is also observed. Chloride-containing catalysts, such as hydrochloric acid or zinc chloride, have to be added to carry out the reaction under the desired conditions.

This process suffers from the disadvantage that chloride-containing pigments are produced which have a corrosive effect in paints.

Chloride-free color-pure zinc ferrite pigments are known from DE-A No. 3 136 279 which are obtained by additionally adding the component system $Al_2O_3$ and $P_2O_5$- forming compound to the iron- and zinc- containing starting materials before annealing.

Thus, an object of the present invention is to overcome the above disadvantages of known processes for producing brilliant, bright anisometric zinc ferrite pigments.

This object is achieved by the present process by homogenously mixing needle-shaped $\alpha$-FeOOH having specific BET surfaces of from 15 to 25 $m^2/g$ and average needle widths of from 0.025 to 0.125 $\mu m$ and average needle lengths of from 0.2 to 0.6 $\mu m$, obtained from iron salt solutions by mixing with alkali and subsequent two-stage oxidation, that is the nucleation and the pigment growth stage, with ZnO having a specific BET surface of more than 2 $m^2/g$, annealing at a temperature of from 700° to 1000° C. and grinding after cooling.

Commercial iron salt solutions and commercially produced zinc oxide serve as starting materials for the present production process. Aqueous solutions of iron-sulphate-heptahydrate, large quantities of which are produced in the pickling of iron metal, are preferably used as iron salt solutions. However, the iron sulphate heptahydrate from titanium dioxide plants which operate by the sulphate process using ilmenites as starting material may also be used. The $\alpha$-FeOOH is produced from these solutions in the first stage, the nucleation stage, by addition of alkalis, such as soda lye, soda solution or magnesite in a quantity such that about half of the iron precipitates as hydroxide. This quantity is then oxidized to produce FeOOH, preferably by gasing with air in mixing vessels. Oxidation may also be carried out using other oxidizing agents, such as nitrates or peroxides. On completion of the oxidizing stage which is carried out at from 30° to 35° C., further iron sulphate solution is added and the suspension is heated to 70° to 90° C. Oxidation is then carried out while holding the pH value constant at from 3.5 to 4.5 by addition of alkalis. This pigment formation is carried out by addition of further iron sulphate solution until the desired average needle width of from 0.025 to 0.125 $\mu m$, average needle length of from 0.2 to 0.6 $\mu m$ and a specific BET surface of from 15 to 25 $m^2/g$ are achieved. These conditions, which are favorable for the zinc ferrite pigment, are generally produced on $\alpha$-FeOOH having a growth factor of from 5 to 10. Accordingly, from 5 to 10 times the amount of goethite is obtained, based on the quantity of nucleus used.

After filtration and thorough washing, the filter cake is once more mashed in water and intimately mixed in a mixing vessel with the desired quantity of zinc oxide. It is necessary at this point to measure the quantity of zinc oxide such that a ratio of iron to zinc, calculated as $Fe_2O_3$ to ZnO, of from 2 to 2.1 is maintained. This should produce an excess of $Fe_2O_3$ over the stoichiometric composition of zinc ferrite $ZnFe_2O_4$ of from 2 to 7% by weight of $Fe_2O_3$. Deviations both upwards and downwards produce a marked drop in the brightness and the amount of yellow in the finished pigment.

The filter cake is fed into the annealing furnace after the suspension has been filtered. Directly-heated rotary tubular furnaces are preferably used for this. The duration of annealing at 900° C. should be at least 10 minutes. The clinker of the furnace is then cooled and it takes from abour 2 to 5 minutes to cool slowly to about 400° C. If cooling is sudden, the pigment loses its brightness. In this case, subsequent annealing at from 400° to 500° C. can reproduce the bright color. Slow cooling or subsequent tempering can also prevent the undesirable ferrimagnetism in the finished pigment which can easily produce segregation and coaggulation in lacquers or the formation of streaking in plastic materials.

From 0.1 to 1.0% by weight, based on the finished pigment, of boric acid and/or boron phosphate and/or boron phosphate- forming components may be added in a stage before annealing, thereby substantially retarding the cooling effect. However, an extension of the cooling time is preferred to the additions owing to the purity of the resulting zinc ferrite and the more straight-forward method. The cooling time may be extended to 2 to 5 minutes from 700° to 1000° C. to from 400° to 500° C. by inserting screw conveyors and a rotary tube which is not cooled or only cooled with air in between the calcination furnace and the cooler. The resulting clinker is then ground to produce the finished pigment in conventional pigment mills, such as pinned disc, bowl, roller, swing or jet mills. The loss of brightness which normally occurs at this point is avoided in the present invention by the addition of specific milling auxiliaries. While conventional milling auxiliaries, such as glycols or amines, have no effect, the addition of from 0.1 to 0.5% by weight of trimethylol propane or methylhydrogenpolysiloxane preserves the full brightness of the pigments. Thus, a further object of the present invention is a process in which trimethylol propane and/or methylhydrogenpolysiloxane or the reaction products thereof are added in a quantity of from 0.1 to 0.5% by weight, based on pigment, before the grinding stage.

The resulting yellow-brown pigment consists of anisometric particles having average particle widths of from 0.1 to 0.3 $\mu$m and average particle lengths of from 0.5 to 1 $\mu$m. By objectively measuring and assessing the color in the CIELAB system (DIN 6 174) the pigment is markedly brighter, more yellow and more saturated, while having the same color strength, than conventional commercial products. The pigment, which is more color-pure and brilliant, also has the advantage of being more dispersible and having lower oil adsorption. The heat-resistance is the same as that of known commercial products. Consequently, it is, as they are, preferably used in stoving lacquers, plastic materials, calcareous sandstone, grains of sand, and ceramic glazes.

Thus, the present invention also relates to such products produced by this process.

The invention is described in more detail with reference to the following examples but is not limited thereto.

EXAMPLE 1

An aqueous solution of iron sulphate with 150 g/l of FeSO$_4$ obtained from pickling is mixed with stirring with sufficient 30% soda lye to precipitate 40% of the iron as iron(II) hydroxide. The precipitated iron is oxidized to the trivalent state by subsequent gasing with air at a temperature of from 30° to 35° C. The pH value then drops from the original 6 to 3.5. Nucleation is thus complete.

Further iron sulphate solution is then fed in and the suspension is heated to 80° C. and gassed with air with further stirring while holding the pH value constant at 4 with soda lye. This process is carried out until 8 times the quantity of $\alpha$-FeOOH obtained during nucleation has been reached. The filter cake is dried after filtration and washing on a rotating filter.

50 kg of this goethite (corresponding to 44 kg of Fe$_2$O$_3$), having a specific BET surface of 18 m$^2$/g, an average needle width of 0.08 $\mu$m and an average needle length of 0.5 $\mu$m, are intensively suspended in 600 kg of water with 21.5 kg of 99.6% commercial zinc oxide having a specific BET surface of 4 m$^2$/g, filtered, annealed for 10 minutes at 900° C. and cooled over a oeriod of 3 minutes to 400° C. Before grinding, 0.6% by weiqht of a 50% aqueous trimethylol propane solution is added to the clinker. A yellow-brown zinc ferrite pigment is obtained which has the following CIELAB-C/2 basic color values measured in the alkydal-F48 lacquer (product of Bayer AG) according to DIN 53 236 and converted accordinq to DIN 6 174.

| Brightness | L* | 52.1 (50.9) |
| Red green proportion | a* | 20.5 (19.7) |
| yellow blue proportion | b* | 37.9 (35.1) |
| saturation | C* | 43.0 (40.2) |

The color values of a conventional commercial zinc ferrite pigment (Mapico TAN 10 from Columbian Carbon Comp.) are given in parentheses by way of comparison.

The pigment obtained by the present invention is thus substantially brighter, more yellow and more saturated. The average particle dimensions determined by electron microscopy are about 0.2 $\mu$m in width and 0.7 $\mu$m in length. The oil adsorption according to DIN 53 199 of 17 g/100 g is advantageously low in comparison with other anisometric zinc ferrite pigments.

EXAMPLE 2

165 g of H$_3$BO$_3$ as 2% boric acid and 165 g of H$_3$PO$_4$ as 85% phosphoric acid are added to the iron oxide hydroxide-zinc oxide suspension of Example 1 before filtration. After filtration, annealing at 900° C. and subsequent sudden cooling a pigment having the following color values is obtained:

| Brightness | L* | 52.1 (49.1) |
| Red green proportion | a* | 19.1 (19.0) |
| yellow blue proportion | b* | 35.7 (32.9) |
| saturation | C* | 40.5 (37.3) |

The color values of a pigment after sudden cooling without previous addition of boric and phosphoric acid are given in parentheses.

EXAMPLE 3

The clinker obtained according to Example 1 is sprayed with 0.3% by weight of Baysilon MH 15 (methylhydrogenpolysiloxane from Bayer AG) and is subsequently ground. A pigment having the same color values as in Example 1 is obtained.

It will be understood that the specification and examples are illustrative but not limitative of the present invention and that other embodiments within the spirit and scope of the invention will suggest themselves to those skilled in the art.

We claim:

1. A process for the production of an anisometric yellow-brown zinc ferrite pigment consisting essentially of homogenously mixing zinc oxide having a specific BET surface of more than 2 m$^2$/g with needle-shaped $\alpha$-FeOOH obtained from an iron salt solution by mixing with alkali and subsequently oxidizing in a nucleation and pigment growth stage, the FeOOH having a specific BET surface of about 15 to 25 m$^2$/g, an average needle width of about 0.025 to 0.125 $\mu$m and an average needle length of about 0.2 to 0.6 $\mu$m, annealing the mixture at a temperature of about 700° to 1000° C. in the absence of a chloride catalyst, cooling and grinding.

2. A process according to claim 1, wherein the nucleation in the production of the $\alpha$-FeOOH is carried out at about 30° to 35° C. and the growth of pigment is carried out at about 70° to 90° C. at a pH of about 3.5 to 4.5.

3. A process according to claim 1, wherein a growth factor of about 5 to 10 is maintained in the formation of the α-FeOOH.

4. A process according to claim 1, wherein the annealed zinc ferrite is cooled to about 400° to 500° C. over a period of about 2 to 5 minutes.

5. A process according to claim 1, including the step of adding to the mixture of iron oxide hydroxide and zinc oxide before annealing about 0.1 to 1.0% by weight, based on pigment, of at least one of boric acid, boron phosphate and boron phosphate-forming components, cooling quickly following the annealing stage.

6. A process according to claim 1, wherein the weight ratio of iron oxide hydroxide to zinc oxide is between about 2.0 to 2.1, calculated as $Fe_2O_3:ZnO$.

7. A process according to claim 1, including the step of adding about 0.1 to 0.5% by weight of the pigment of trimethylol propane and/or methylhydrogenpolysiloxane or reaction product thereof before grinding.

8. A process according to claim 2, wherein a growth factor of about 5 to 10 is maintained in the formation of the α-FeOOH and the annealed zinc ferrite is cooled to about 400° to 500° C. over a period of about 2 to 5 minutes, the weight ratio of iron oxide hydroxide to zinc oxide being between about 2.0 to 2.1, calculated as $Fe_2O_3:ZnO$, the process including the steps of adding to the mixture of iron oxide hydroxide and zinc oxide before annealing about 0.1 to 1.0% by weight, based on pigment, of at least one of boric acid, boron phosphate and boron phosphate-forming components, cooling quickly following the annealing stage and adding about 0.1 to 0.5% by weight of the pigment of trimethylol propane and/or methylhydrogenpolysiloxane or reaction product thereof before grinding.

9. A zinc ferrite pigment produced by the process of claim 1.

10. A zinc ferrite pigment produced by the process of claim 8.

* * * * *